(12) United States Patent
Boulain

(10) Patent No.: US 8,240,349 B2
(45) Date of Patent: Aug. 14, 2012

(54) PERFORATION-RESISTANT FLEXIBLE ENCLOSURE

(76) Inventor: Robert Georges Boulain, L'ayguade/Hyeres (FR)

( * ) Notice: Subject to any disclaimer, the term of this patent is extended or adjusted under 35 U.S.C. 154(b) by 683 days.

(21) Appl. No.: 12/303,014

(22) PCT Filed: May 30, 2007

(86) PCT No.: PCT/FR2007/000891
§ 371 (c)(1),
(2), (4) Date: Jun. 18, 2009

(87) PCT Pub. No.: WO2007/138189
PCT Pub. Date: Dec. 6, 2007

(65) Prior Publication Data
US 2009/0266464 A1    Oct. 29, 2009

(30) Foreign Application Priority Data

May 30, 2006    (FR) ...................... 06 04790

(51) Int. Cl.
*B60C 5/00*    (2006.01)
*B60C 19/12*   (2006.01)
(52) U.S. Cl. .................. 152/331.1; 152/336.1; 152/502; 152/505
(58) Field of Classification Search ............... 152/331.1, 152/336.1, 502, 503, 504, 505
See application file for complete search history.

(56) References Cited

U.S. PATENT DOCUMENTS

| 3,129,743 A | 4/1964 | Nonnamaker |
| 5,785,779 A | 7/1998 | McGee et al. |

FOREIGN PATENT DOCUMENTS

| GB | 2240953  | 8/1991 |
| RU | 2064870  | 8/1996 |
| WO | 02/18158 | 3/2002 |

OTHER PUBLICATIONS

The State Intellectual Property Office of the People's Republic of China, Notification of First Office Action, dated Feb. 12, 2010, 13 pages, Beijing, China.
The State Intellectual Property Office of the People's Republic of China, Decision on Rejection, dated Oct. 13, 2010, 12 pages, Beijing, China.
The State Intellectual Property Office of the People's Republic of China, Notification of the Second Office Action, dated Mar. 29, 2011, 7 pages, Beijing, China.
The State Intellectual Property Office of the People's Republic of China, Notification on the Grant of Patent Right for Invention, dated Aug. 4, 2011, 3 pages, Beijing, China.
Federal Institute for Industrial Property of Federal Service for Intellectual Property, Patents and Trademarks, Request for Substantive Examination, dated Feb. 10, 2011, 6 pages, Moscow, Russia.
Federal Institute for Industrial Property of Federal Service for Intellectual Property, Patents and Trademarks, Decision on Issue of a Patent for an Invention, dated Jul. 14, 2011, 12 pages, Moscow, Russia.
World Intellectual Property Organization, Written Opinion of the International Searching Authority, dated Dec. 10, 2008, 10 pages, Geneva, Switzerland.

*Primary Examiner* — Justin Fischer
(74) *Attorney, Agent, or Firm* — Dennis R. Haszko

(57) ABSTRACT

Flexible enclosure comprising a working strip 2 and sidewalls 3, defining an envelope, and a sealing membrane 11 at least partially lining the envelope. The sealing membrane 11 is comprised of an elastic material 14 and a perforation-resistant reinforcement 15, the sealing membrane 11 being free with regard to the working strip 2 and attached to an opposite edge remote to the working strip 2.

28 Claims, 4 Drawing Sheets

PERFORATION-RESISTANT FLEXIBLE ENCLOSURE

The present invention concerns the area of tight flexible enclosures meant to resist perforation.

In the area of tyres for vehicles, the document WO0218158 describes a puncture-resistant barrier placed between the tread and the casing of the tyre. The perforation-resistant barrier works like a protective shield against penetration or impact and can resist up to the limit of its breaking strength. This specific location in the structure of the tyre and its bond to the surrounding layers hold it in an immovable position. This barrier only provides a slightly improved protection against a small-scale perforating strain, which is not enough to prevent most perforations.

Also in the area of tyres for vehicles, there are known systems, such as an auto-sealing liquid, which are aimed at keeping a certain ability for rolling after a puncture, but these are only effective for perforations of small dimensions.

A complex device composed of a semi-rigid framework, fixed to the wheel and calculated to bear the punctured and collapsed tyre in order to maintain a minimum of height of the tyre, can be inserted into the pneumatic enclosure allowing the vehicle to reach a repair service station at a limited speed of about 80 km/h (50 miles/h). The possibility that a repair service station would have the special device to remove and repair this type of tyre known as "Pax System", is relatively rare. Also, the repair service station must be at a distance no further than about 100 km (62.5 miles). More particularly, such devices have the disadvantage of the definitive deterioration of the tyre if it rolls whilst collapsed for too long a distance. Furthermore, these devices need a permanent control of the real pressure of every tyre by appropriate electronic means. The result being an important additional weight and cost and a limited reliability due to operating defects of the circuits and the pressure sensors of the tyres. Finally, it was noted that recurring vibrations, starting from speeds of about 130 km/h (80 miles/h), made it very difficult and uncomfortable to drive vehicles fitted up with such a device, causing complaints from the users towards the relevant manufacturing companies. These devices do not reduce the risk of punctures.

The document U.S. Pat. No. 5,785,779 proposes to place a puncture-resistant strip of synthetic material between the internal surface of the tyre under its tread and the inner tube. When a sharp body goes through the tread, the puncture-resistant strip acts like a protective barrier in the inner tube. This can be efficient against small sharp bodies of small dimensions such as thorns if the puncture-resistant strip is set up correctly and doesn't move. The puncture-resistant strip increases the rolling resistance of the tyre and is also responsible for a relatively frequent internal abrasion. The puncture-resistant strips are mostly used in the area of bicycle tyres.

The present invention is aiming at remedying the above-mentioned disadvantages.

The present invention aims to propose a flexible enclosure fitted up with improved puncture-resistant means adapted to the multiple applications of the flexible enclosures.

The present invention aims at providing improved puncture-resistant capacities to the tyres of vehicles, flexible tanks, pneumatic boats, etc.

The present invention aims at providing an effective puncture-resistant, protective, polyvalent with regard to the risk of perforation encountered in the considered application.

According to one aspect of the invention, a flexible enclosure comprises a working strip and sidewalls, defining an envelope. The flexible enclosure comprises a sealing membrane which, at least partially, lines the inside of the envelope and comprises both an elastic material and a perforation-resistant reinforcement, the sealing membrane being free with regard to the working strip and attached to an opposite edge remote from the working strip.

In case of a perforation in the envelope at the level of the sealing membrane, the sealing membrane can move along inside the flexible enclosure taking on, at least partially, the shape of the foreign body that perforated the envelope, thus diminishing the risk of perforation of the flexible enclosure. The sealing membrane is able to move away from the working strip, absorbing energy at the same time.

In an embodiment, the sealing membrane is attached to at least part of the sidewalls. The flexible enclosure can set up an inflatable element, for example a pneumatic boat. The sealing membrane does not enable fluids, gas and/or liquids, to permeate.

In an embodiment, the enclosure comprises beads defining the sidewalls, the sealing membrane being attached at least to a part of the beads.

In an embodiment, the sealing membrane is free with regard to at least one sidewall. The enclosure can constitute a tyre of a vehicle.

In a tyre of a vehicle, the sealing membrane can be attached to the beads and free with regard to the sidewalls and to the tread in order to protect the sidewalls and the tread. The sealing membrane can be attached to the sidewalls and free with regard to the tread in order to protect the tread. The sealing membrane can be attached to the beads and to the tread and free with regard to the sidewalls in order to protect the sidewalls.

Alternatively, the enclosure can constitute a tank of a rectangular or cylindrical shape. In a rectangular-shaped tank the sealing membrane can be attached near the base and to the top and free with regard to the sidewalls constituting the working strip exposed to projectiles in order to protect the said sidewalls. In a cylindrical-shaped tank, the sealing membrane can be attached to the edges of the cylinder and free with regard to the surface of revolution constituting the working strip, and possibly the tread, exposed to projectiles and to sharp bodies in order to protect the surface of revolution.

In an embodiment, the developed length of the meridian of the sealing membrane is greater than that of the meridian of the flexible enclosure. The movement of the sealing membrane is made easier when a foreign body has punctured the envelope.

Preferably, the developed length of the meridian of the sealing membrane is greater by about 10 cm (4 inches) compared to that of the meridian of the enclosure. In a tyre of a vehicle having a slow rotational motion, for example a truck tyre, agricultural vehicles or armoured combat vehicles with wheels, the developed length of the sealing membrane can be greater by about 15 cm (6 inches) compared to that of the meridian of the enclosure—the additional weight being small if compared to the total weight of the tyre.

In an embodiment, the flexible enclosure comprises an additional sealing membrane lining, at least partially, the inside of the first sealing membrane. The additional sealing membrane comprises an elastic material and a perforation-resistant reinforcement and is at least partially free with regard to the first sealing membrane and attached to an opposite remote edge to the tread. The risk of perforation is again reduced.

In a tyre of a vehicle having a slow rotational motion, for example a tyre for trucks, agricultural vehicles or armoured combat vehicles, two or three additional sealing membranes can be added, the additional weight being small when compared to the total weight of the tyre.

In an embodiment, the flexible enclosure comprises a plurality of balls arranged in a bed between the working strip and the sealing membrane. The relative movement of the sealing membrane with regard to the working strip is made easier because of the rotation of the balls. The friction of the sealing membrane with regard to the working strip is reduced, hence a risk reduction of perforation of the sealing membrane.

The balls can be of a diameter in a range of between 0.2 (0.079 inch) and 3 mm (0.118 inch). The balls can be made of glass or ceramic, for example the Zirmil® type from the SEPR Company.

In an embodiment, the balls are lubricated. The lubricant can comprise molybdenum disulphide, graphite, silicone, talc, PTFE, etc.

In an embodiment, the sealing membrane comprises an elastomer, preferably a halogenated butyl rubber (halobutyl).

In an embodiment, the sealing membrane comprises at least a bonding material of the perforation-resistant reinforcement onto the elastic material.

In an embodiment, the elastic material covers at least one of the faces of the perforation-resistant reinforcement.

The sealing membrane can comprise a butyl rubber and/or a halogenated butyl rubber (halobutyl), a nitrile, a halogenated nitrile, a polychloroprene, a chlorosulfonated polyethylene for example Hypalon®, a styrene-butadiene rubber (SBR), a silicone, a fluoroelastomer for example Viton®, an ethylene propylene diene monomer rubber (EPDM), etc. according to the considered application in order to constitute an efficient and long-term barrier to gas or liquids fluids, the said sealing membrane lining all the inside of the enclosure or not.

The perforation-resistant reinforcement of the sealing membrane can be made of a high-tenacity textile type and/or of non-woven fabrics, such as aramid fibres, notably para-aramid, for example Kevlar®, or meta-aramid, for example Nomex®, of a very high molecular weight polyethylene for example Dyneema® or Spectra®, of a liquid crystal polymer, for example Vectran®, of glass fibres, polyamide, polyester, cotton, etc. or similar or of a compound of these fibres depending on the minimal and maximal temperatures conditions, the resistance to the high frequency repeated flexions, the pressure, etc. The perforation-resistant reinforcement can also comprise or even be doubled by materials of polyurethane type having a much greater perforation breaking strength to that of the elastic material of the sealing membrane.

In an embodiment, the perforation-resistant reinforcement is coated with an adhesiveness-promoting layer in order to be the strongest and the most thoroughly possible bond to the elastic material at a later stage, the adhesion between the perforation-resistant reinforcement and the elastic material being the highest possible in order to constitute a reinforced sealing membrane composite material which is also a flexible and tough bonding.

In an embodiment, the perforation-resistant reinforcement is covered on at least one face by the elastic material, in particular the face in contact with the inside of the envelope in order to deliver a final aspect as smooth as possible.

In the case of tyres for civil vehicles, the sealing membrane can be free with regard to the tread and can be attached to the bead and/or to the sidewall of the tyre, the perforations taking place most often through the tread. In the case of military or agricultural vehicles the sealing membrane will be free with regard to the sidewall of the tyre and will possibly be attached to the beads and/or to the inside of the tread, the punctures often occurring because of perforation of the sidewall by ballistic projectiles in the case of military vehicles or even by stones or sharp bits of wood in the case of agricultural vehicles. In both cases a tyre having a sealing membrane attached to the bead and free with regard to the sidewall and the tread can be achieved.

The fact of providing for a plurality of sealing membranes that have the meridian length as long as possible allows an increase in the probability of a gap between the holes of the sealing membranes after a puncture, maintaining a certain air-tightness. This characteristic is particularly interesting in the case of the tyres for military purposes. In the case of two sealing membranes having undergone a perforation, the hole of the first sealing membrane can move along circumferentially or laterally with regard to the hole of the sidewall of the tyre and the hole of the second sealing membrane can also move along with regard to the hole of the first sealing membrane. Thus the probability of keeping a correct inflation of the tyre is substantially increased in spite of a perforation by a projectile.

Of course, in the case of a plurality of sealing membranes, there is a high probability that a projectile will be stopped by one of the successive sealing membranes and that no total perforation arises. Then the tyre keeps its inflation of origin. This phenomenon can also occur in the case of a perforation of a flexible tank like those of a vehicle or again in the case of a tank of large capacity for supplying water or fuel.

Thus, when a projectile with a particularly high kinetic energy, manages to perforate the wall of the enclosure itself, and then reaches the first reinforced sealing membrane, the projectile causes the looseness of the said membrane, because of its non-attachment to the internal wall of the envelope and can manage to perforate it if its kinetic energy is sufficient. The projectile will still have to have a sufficient residual energy to loosen up the second reinforced sealing membrane and perforate it and, eventually, the following sealing membranes. Thus the different membranes work successively as a deadening and absorption of the kinetic energy of the projectile.

Preferably, the dimension of the length of the meridian of the sealing membranes must increase from the first membrane in contact with the inside of the envelope to the last membrane. Besides, there is a significant probability that the ballistic projectile could be deflected from its initial trajectory, thus favouring the phenomenon of putting out of alignment the eventual perforations of the perforated membranes and thus making an automatic filling up of the perforations easier. The number and the resistance of the sealing membranes can be calculated in order to resist the usual projectiles, for example of 7.62 mm. (0.30 inch) or again of 12.7 mm. (0.50 inch) at the usual distances of combat. The effective deflection of the trajectory of the projectile can be supplied from the resistance produced by the combination of the varying reactive force, progressive and roughly omnidirectional of the internal pressure of the pneumatic enclosure on the one hand, and, on the other hand, from the resistance of the constituent materials of the said membranes.

Thus, if in addition to the intrinsic resistance to the perforation of the materials constituting the reinforced membranes, a high number of membranes and/or of perforation-resistant reinforcements, a gradual increase of the length of the meridian of each of the sealing membranes and an alternation of the systems, make the lateral moving of the various membranes easier in order to create tribological differentials of the lateral moving of the various membranes with regard to each other, this will help reduce the probability of alignment of the successive perforations. As an example, a layer of small spherical balls can be included between sealing membranes, a pasty lubricant, for example based on silicone between two other sealing membranes, and a dry lubricant, for example molybdenum disulphide between again two other sealing membranes.

The balls, arranged in a bed between the working strip and the sealing membrane can also be arranged between two sealing membranes. The balls can comprise polyamide-imide, polyacetal, polyamide or similar. As an example, balls in hard ceramic like the Zirmil® type containing 93% of Zirconium oxide and having an average diameter of 1 mm. and a specific gravity of 5.9 can be used. Depending on the specific gravity of the chosen balls, the additional weight to be expected is roughly from 5 to 30 grams/dm2 (0.1076 square foot), for example 23 grams/dm2, in order to leave a certain space between the balls.

Balls in standard ceramic such as the type ER 120 of the SEPR Company with a specific gravity of 3.8, in TORLON 4275 of the SOLVAY ADVANCED POLYMERS Company which is of the type polyamide-imide with a specific gravity of 1.49, in Delrin® of the DU PONT DE NEMOURS Company, which is of the polyacetal type with a specific gravity of 1.41 or again in nylon of the SALUC Company with a specific gravity of 1.14 can be also used. The bed of balls allows the largest lateral movement of the reinforced sealing membranes in spite of the surrounding opposite forces which come, on the one hand, from the internal pressure of the enclosure and, on the other hand, from the penetration strength of the perforating or sharp body.

A part of the kinetic energy of the perforating or sharp body is, at the first stage of the attempted perforation, partially absorbed by the penetration resistance of the materials constituting the outer layer of the envelope. At the second stage of the attempted penetration and insofar as the perforating or sharp body goes through the outer layer of the envelope, the said perforating or sharp body then encounters the sealing membrane which is free with regard to the inner wall of the envelope. The adhesion of the sealing membrane to the inner wall of the envelope is proportional to the internal pressure of the enclosure and also depends on the sum of the surfaces of the spherical caps of the balls. The presence of the balls between the inner wall of the envelope and the reinforced sealing membrane allows it to move laterally with a much greater ease than if the inner wall of the envelope and the sealing membrane were in direct contact. A spherical shape is by definition at the origin of easy omnidirectional movements, and the resistance of movement in the sealing membrane is, essentially, reduced to a value proportional to the internal pressure of the enclosure.

The friction and sliding related to the movement of the balls caused by the eventual lateral movements of the sealing membrane that they bear, offer a considerably less important resistance than in the case of a direct and very close friction between the inner wall of the envelope and the sealing membrane. Because of this, the reinforced sealing membrane can move laterally very easily and take on the exact shape of the perforating or sharp body with a considerably reduced resistance when a perpendicular pushing force due to that body, attempts to perforate the whole. Besides, the displacement energy is shared out in a relatively uniform way. The coefficient of friction corresponding to that of the contact surfaces between the balls and the surrounding walls, notably of the sealing membranes and the internal wall of the envelope, constitute a force of relatively low resistance which can be again reduced by the addition of a lubricant. Hence, in spite of the internal pressure of the envelope, the reinforced sealing membrane can deform itself very easily because of its lateral mobility.

Let's assume that:

$$R_m + R_r > F_s + F_r + A,$$

Where:
$R_m$=perforation resistance of the elastic material,
$R_r$=perforation resistance of the reinforcement structure,
$F_s$=sliding friction,
$F_r$=rolling friction resistance of the balls,
A=Adhesion
If $E<R_e$ there is no perforation of the envelope
Where:
E=kinetic energy of the projectile,
$R_e$=perforation resistance of the envelope,
If $E>R_e$ and $E-R_e-PV-F_s-F_r-A<R_m+R_r$
There is no perforation of the sealing membranes,
Where:
P=internal pressure of the pneumatic enclosure,
n=number of sealing membranes.
V=volume displaced inside the pneumatic enclosure.
If $E>R_e$ and $E-R_e-PV-F_s-F_r-A<n(R_m+R_r)$, the whole of the sealing membranes are not completely perforated.

In the hypothesis that a projectile perforates all of the sealing membranes, and that the sealing membranes have a meridian length longer than that of the internal wall of the envelope, the said sealing membranes undergo a probable lateral move. As a result, the certain probability of non-alignment of the successive perforations of the membranes, and the subsequent conservation of tightness, leads to the probability being maximal if the angle shaped between the trajectory of the projectile and the membranes is near 0°. In other words, this probability decreases with regard to the angle of incidence of the projectile.

In an embodiment, the balls can be processed with a lubricant. The balls can be coated with pasty compounds of molybdenum disulphide, of graphite, of silicone, or of talc according to the considered purpose. Another possibility is coating the balls with specific refined products such as a coating based on polytetrafluoroethylene or similar. The processing of balls made of polyimide containing at least a part of graphite and of polytetrafluoroethylene such as the TORLON 4275 can allow a significant reduction of the need to lubricate, even its elimination.

The present invention will be more understandable after studying the detailed description of some ways of realisation given as examples which are not at all restrictive and are illustrated by the enclosed drawings in which.

Figure 1:
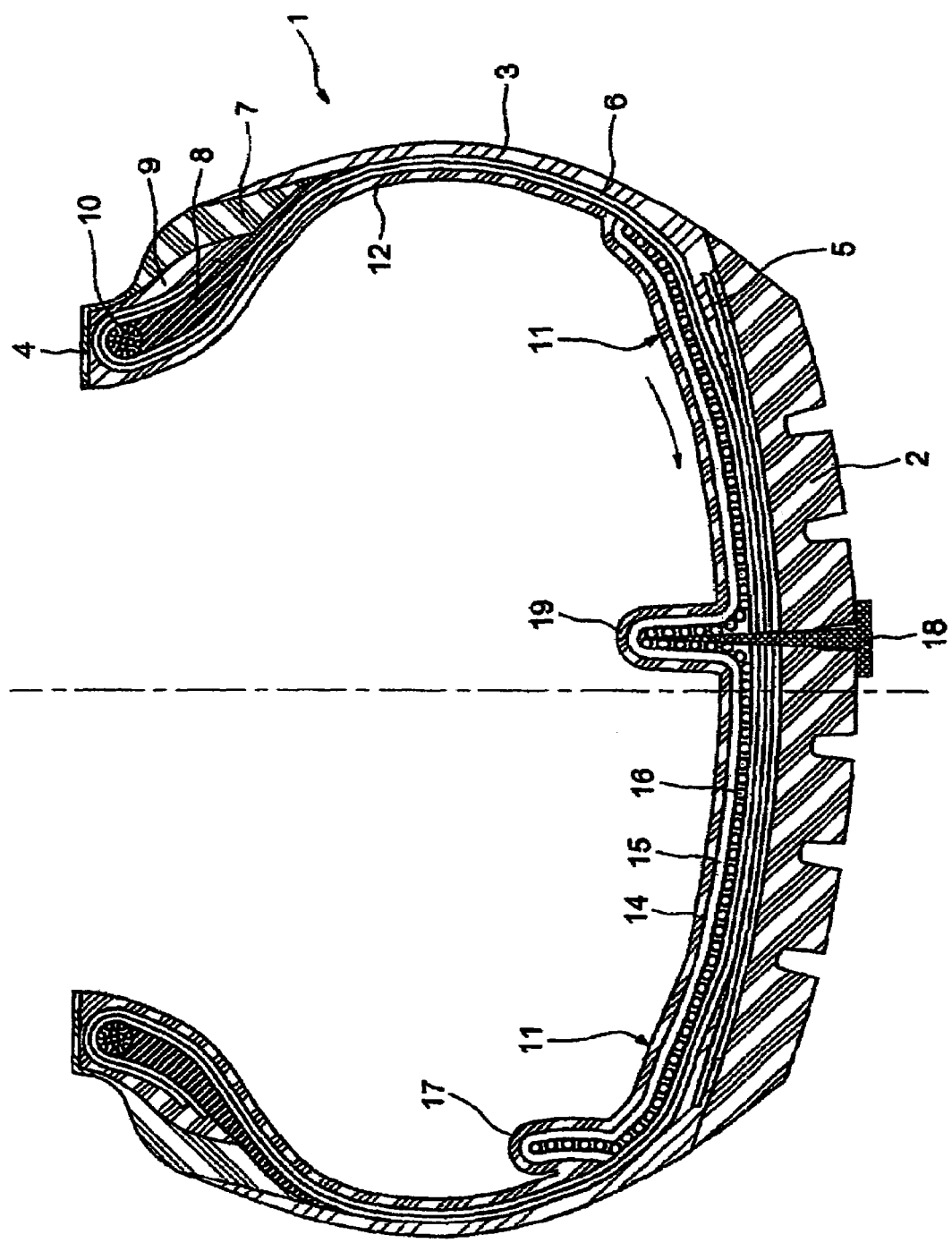
FIG. 1 is a view of a meridian section of a pneumatic enclosure.

In the embodiment illustrated in FIG. 1, the pneumatic 1 is intended for a vehicle, such as a private car, and has been represented in a normal position in the left half side of the figure and after an attempt of perforation in the right half side of the figure. The tyre 1 comprises a tread 2 meant to be in contact with the ground, sidewalls 3 and beads 4, the sidewalls 3 and the beads 4 being symmetrical with regard to a radial plan.

Besides, provision is made for, at least one belt plies layer 5 laid onto the internal side of the tread 2 and a carcass layer 6 enlarging upon an internal side of the belt plies layer 5, sidewalls 3 and coming up to the bead 4 in order to make a remaining opened loop there. The belt plies layer 5 is a circular shape. The carcass layer 6 is a radial shape and enlarges itself from one bead 4 to another bead 4 with ends folded up again in each bead 4. A reinforcement layer 7 is arranged between the sidewall 3 and the bead 4. A filling in layer 8 is arranged into the pleat of the carcass layer 6. A layer 9 comes to form the bead heel in surrounding the carcass layer 6. In the remaining opened loop formed by the end of the carcass layer 6, a cluster of wires 10, for example metallic, also called bead, is arranged, giving a strong rigidity to the bead heel 4.

Moreover, the tyre 1 comprises a perforation-resistant system 11 comprising an elastic layer 12 which is attached to the internal face of the sidewall 3 and able to be located in the continuation of the layer 9 of the bead 4, an elastic layer 14 which can be made of the same material as the elastic layer 12, for example an elastomer, forming the internal face of the said perforation-resistant system 11 roughly at the level of the tread 12. The perforation-resistant system 11 completes itself by a perforation-resistant reinforcement 15 and a bed of balls 16. The bed of balls 16 is in contact with the internal face of the pneumatic envelope, for example as an air-tight layer not visible due to its small thickness.

The perforation-resistant reinforcement 15 is arranged between the elastic layer 14 and the balls layer 16. The perforation-resistant reinforcement 15 and the elastic layer 14 are strongly and perfectly attached to each other in order to obtain an excellent cohesion. The balls are free between the internal face of the pneumatic envelope and the perforation-resistant reinforcement 15. Layers 14 and 15 are free with regard to the envelope, roughly at the level of the tread 2. Furthermore, an over-length of the layers 14, 15 and 16 is intended to form a pleat 17 roughly at the level of the junction between the tread 2 and the sidewall 3, for example near the elastic layer 12. Thus the pleat 17 constitutes a reserve of length of the layers 14 to 16 and allows the said layers 14 to 16 to move along themselves as illustrated in the right part of the figure.

A nail 18 pierced the tread 2 and went through the plies belt 5 and the carcass layer 6. However, the nail 18 could not perforate the perforation-resistant system 11 which has taken the exact shape of the said nail 18 by moving along itself laterally in the direction of the arrow in order to form a protuberance 19 around the end of the nail 18. The layer of balls 16 makes the movement easier by causing an unfolding and a consequent suppression of the pleat 17. In other words, the over-length of the layers 14 to 16 moved along the internal face of the envelope in a lateral direction in order to come on the exact shape of the nail 18 without perforation. The perforation-resistant reinforcement 15 is able to resist to a relatively high force applied to a small surface and the elastic layer 14 ensures the tightness between the inside of the pneumatic tyre 1 which will be generally inflated at a pressure definitely higher than the atmospheric pressure.

Thus an extremely high capacity of resistance to a high force puncture is provided. Layers 14 and 15, strongly bond together but being at the same time free with regard to the inside of the envelope roughly at the level of the tread 2, can resist a kind of perforation for which layers of a similar makeup, but attached to the internal face of the tread, would have been unable to resist.

Figure 2:
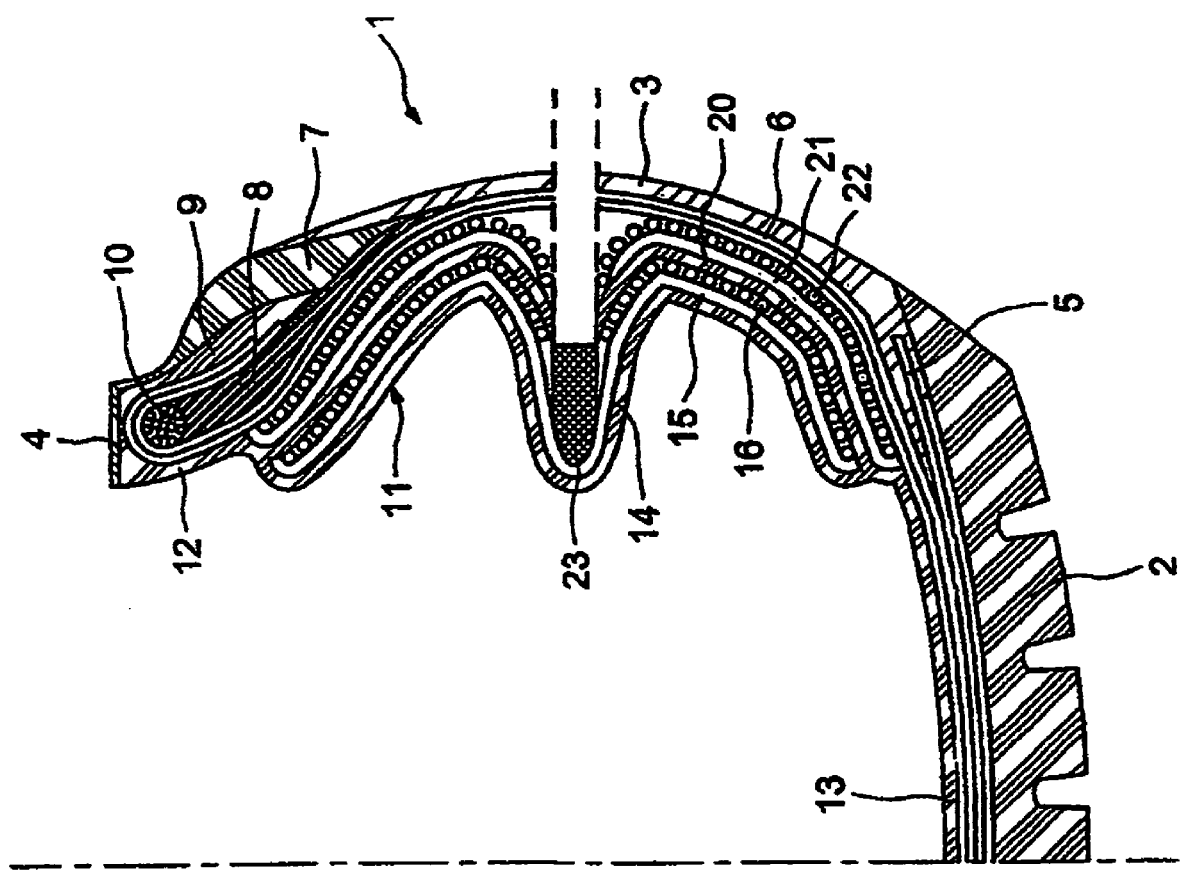
FIG. 2 is a half-view of a meridian section of a pneumatic enclosure.

In the embodiment illustrated in FIG. 2, the pneumatic tyre 1 is of the type intended for military or agricultural vehicles, the sidewalls of which are particularly exposed to perforation by projectiles, stones or sharp pieces of wood. The envelope of the pneumatic tyre 1 shows a similar structure to that of the preceding embodiment. The perforation-resistant system 11 differs from the preceding one as it comprises a layer 12 of an elastic material attached to the bead 4, a layer 13 of an elastic material attached to the internal face of the reinforced layers 5, roughly at the level of the tread 2 and of the layers 14 to 16, of a similar structure to that of the preceding embodiment but placed on the internal face of the sidewall 3.

Layers 14 to 16 are completed by an additional elastic layer 20 which can be produced from the same material as the elastic layers 12, 13 and 14 arranged in contact with the layer of balls 16 at the opposite side of the perforation-resistant reinforcement 15, an additional perforation-resistant reinforcement 21 arranged at the external side of the elastic layer 20 and an additional row of balls 22 arranged between the additional perforation-resistant reinforcement 21 and the internal face of the envelope. Thus, there are two sealing membranes which are made up of both an elastic layer and of a perforation-resistant reinforcement, consequently reducing a perforation risk.

A projectile 23 has perforated the sidewall 3, the additional perforation-resistant layer 21 and the additional elastic layer 20 causing the deformation of the internal sealing membrane which is made up of the elastic layer 14 and the perforation-resistant reinforcement 15. Thus, there is an advantage of a high probability of stopping a projectile or a perforating element before it has pierced the internal sealing membrane. Of course, a higher number of sealing membranes can be provided, for example three or four, and this is due to the fact of the relatively slow rotation speed of the tyres for military or agricultural purposes.

In order to have a good attachment of the sealing membranes, it is preferable to achieve continuity and tight adhesion of the elastic layers 12, 13, 14 and 20. In the same way, a sealing membrane, internal or external, is supplied with strongly bonded layers, specifically the elastic layer 14 and the perforation-resistant reinforcement 15.

The pleat 17 visible in FIG. 1 has not been represented in FIG. 2 because the tyre 1 is shown under the length of a projectile and consequently after deformation. Before deformation of the perforation-resistant system 11, the over-length of the internal and external sealing membranes can be arranged near the bead heel 4 or in the opposite direction, near the tread 2.

As a variant, one of the two rows of balls 16 or 22 can be replaced by a layer of a dry or liquid lubricant. A tyre can be also fitted up with a perforation-resistant system like the type illustrated in FIG. 1 and with a perforation-resistant system of the type illustrated in FIG. 2, either providing for a relatively selective attachment to the edge between the tread 2 and the sidewall 3, or providing for an attachment of the perforation-resistant system to the bead heel 4 as illustrated in FIG. 2.

Figure 3:
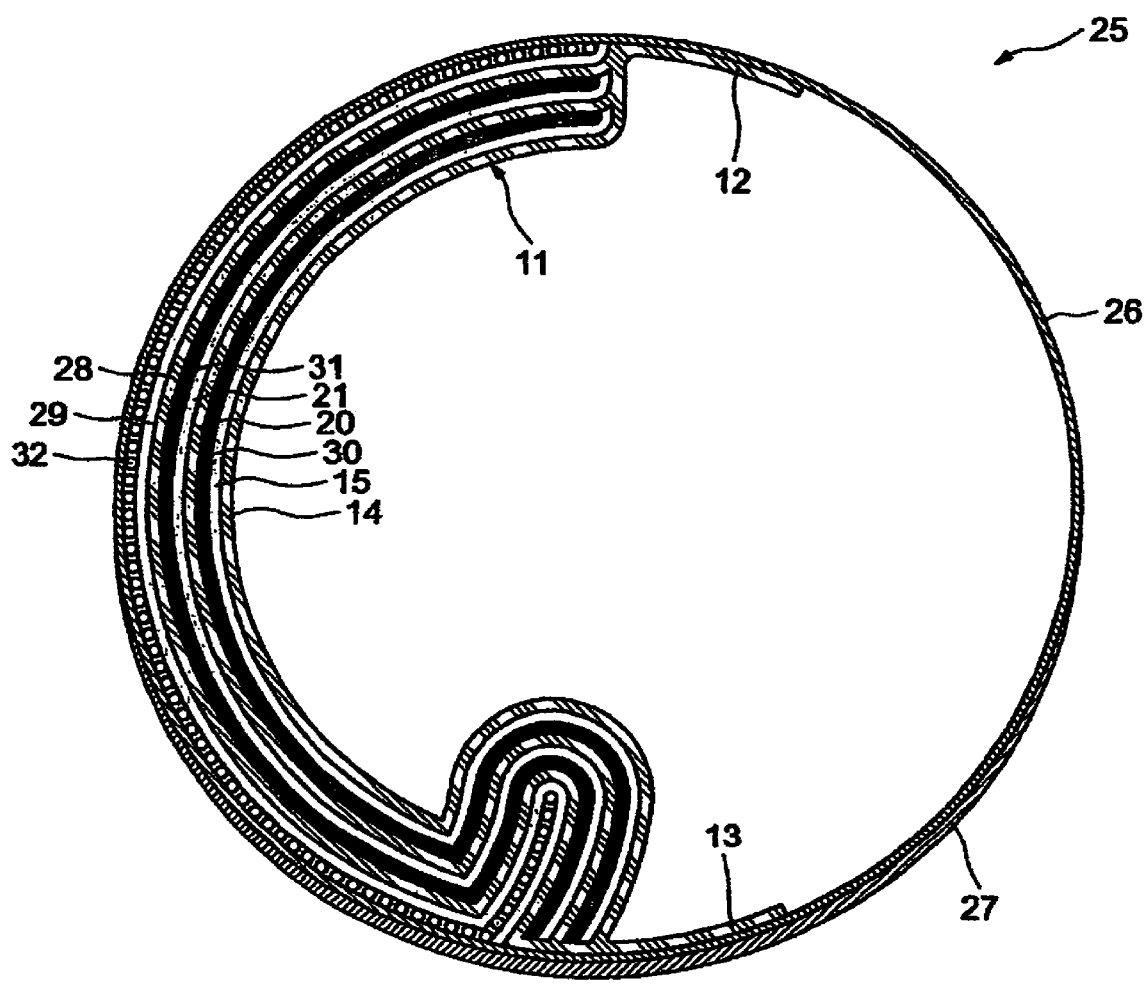
FIG. 3 is a partial view of a cross section of an element of a pneumatic boat.

In the embodiment illustrated in FIG. 3, a pneumatic boat element 25 includes a circular envelope 26, a lower reinforcement 27 in order to prevent excessive wear-out during ground manipulations and being able to be made of a synthetic material of an elastomer type or still of a plastic type, and a perforation-resistant system 11 intended to be arranged onto the sidewall of the pneumatic boat element 26 exposed to the outside and therefore to be subject to perforation by perforating or sharp bodies. The structure of the tightness system 11 is similar to that illustrated in FIG. 2 with an attachment of the perforation-resistant system 11 by elastic layers 12 and 13 respectively, at the top and at the base of the internal face of the envelope 26.

The perforation-resistant layer 11 includes three sealing membranes made up of the elastic layers 14, 20 and 28 and of the perforation-resistant reinforcements 15, 21 and 29, separated by a layer of dry lubricant 30 and a PTFE layer 31, respectively. A layer of balls 32 is arranged between the perforation-resistant reinforcement 29 and the internal face of the envelope 26 with balls made of nylon, to lessen the weight. Thus, an extremely interesting ballistic protection for pneumatic boats is obtained and this with a very small increase of weight.

Besides, the high number of sealing membranes, each of which includes at least one elastic layer and at least one perforation-resistant reinforcement, allows an increase in the probability of a gap between the holes of the different membranes due to perforation by the same perforating body. This probability of a gap between the holes is again increased by the difference of the meridian lengths of the sealing membranes.

The meridian length of the sealing membranes can be much longer so that the sealing membrane is near the inside of the envelope. Thus an increasing capacity of deformation of the sealing membranes from the outside towards the inside is obtained. In other words, a projectile meets sealing membranes more and more capable of deforming themselves and consequently insuring a gradual absorption of the energy favouring the dissipation of the kinetic energy of the projectile.

Figure 4:
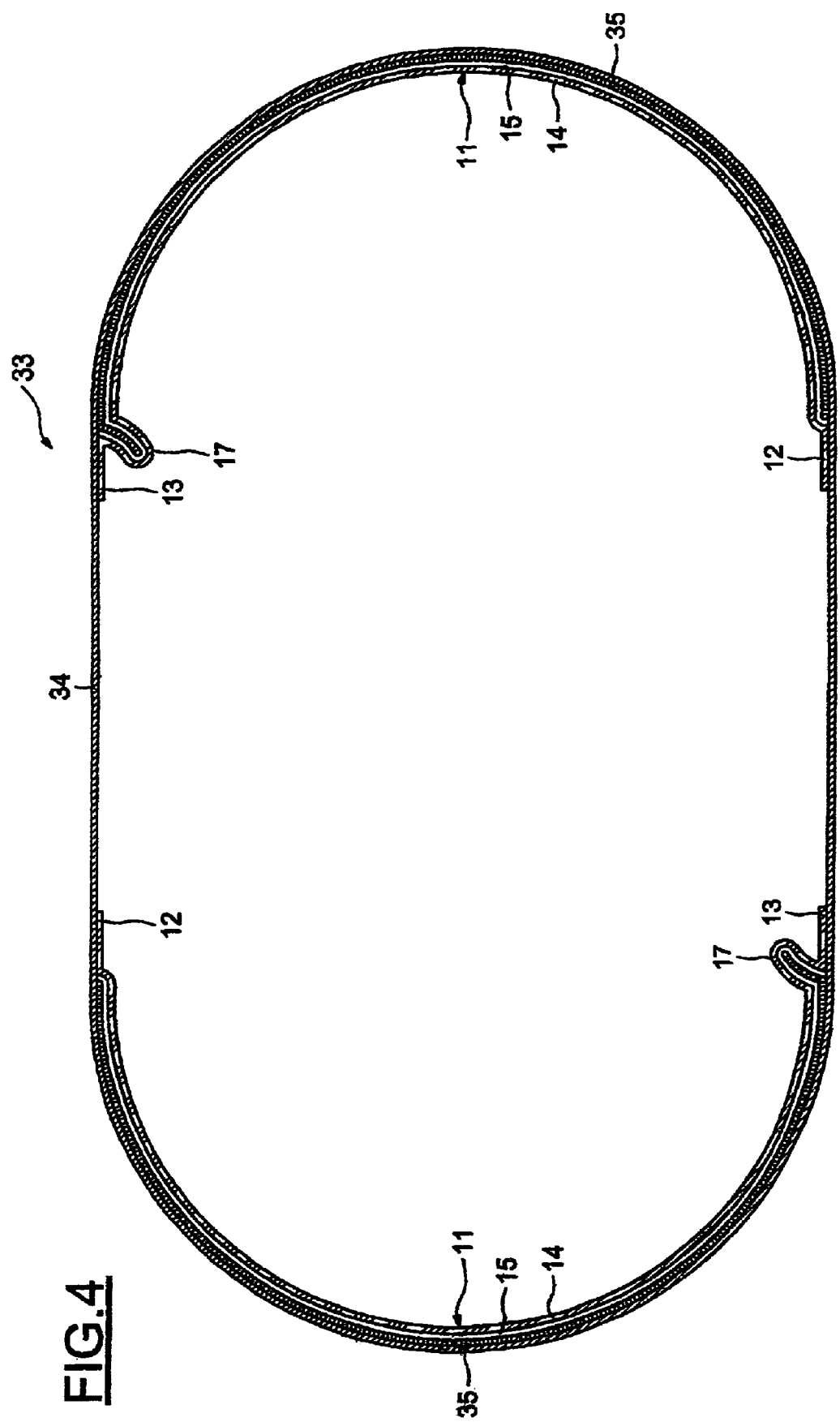
FIG. 4 is a partial view of a cross section of a flexible tank.

In FIG. 4, a flexible tank 33 containing fuel, for example, is illustrated. The flexible tank 33 includes an envelope 34 inside of which a perforation-resistant system 11 is attached onto the edge of the said flexible tank 33 to protect against the perforations provided by projectiles or sharp instruments. The perforation-resistant system 11 includes a membrane supplied with an elastic layer 14, of attachment elastic layers 12 and 13, of a perforation-resistant reinforcement 15 and a layer of balls 35, for example made of ceramic. The layer of balls 35 gives an excellent rolling ability of the sealing membrane with regard to the envelope 34, and therefore a high capacity of deformation of the perforation-resistant system 11. The perforation-resistant system 11 can also be included in a cylindrical-shaped tank.

In the case of a flexible tank, the perforation-resistant reinforcement 15 can be particularly thick. A sealing membrane comprising two perforation-resistant reinforcements separated by a layer of elastic material, can also be provided. As the liquid contained in the flexible tank 33 is basically not compressible, the absorption of the energy due to a projectile is insured by the sealing membrane and by the overall deformation of the flexible tank, whereas the envelope 34 itself can provide a relative elasticity. The kinetic energy of an eventual projectile can therefore dissipate itself by the movement of the sealing membrane, the displacement of the liquid and by the movement and the deformation of the envelope 34. Thus the capacities of resistance of a flexible tank to sharp bodies or even projectiles can be increased in a significant way.

The invention claimed is:

1. A flexible enclosure comprising:
a working strip (2) and sidewalls (3), the working strip and the sidewalls defining an envelope;
a sealing membrane (11) which lines at least part of the envelope, the sealing membrane (11) including an elastic material (14) and a perforation-resistant reinforcement (15), and the sealing membrane being movable relative to the working strip and being attached at opposite edges remote from the working strip; and
a plurality of balls (16) arranged in a bed between the working strip and the sealing membrane.

2. The enclosure according to claim 1, in which the sealing membrane is attached to at least part of the sidewalls (3).

3. The enclosure according to claim 1, further including beads (4) bounding the sidewalls (3), and the sealing membrane (11) being attached to at least part of the beads.

4. The enclosure according to claim 3, in which a developed length of the meridian of the sealing membrane is greater than that of a meridian of the envelope.

5. The enclosure according to claim 3, further including at least one additional sealing membrane which at least partially lines the inside of the first sealing membrane, the additional sealing membrane including an elastic material (20) and a perforation-resistant reinforcement (21), and the additional sealing membrane being at least partially not attached to the first sealing membrane and being attached at opposite edges remote from the working strip.

6. The enclosure according to claim 1, in which the sealing membrane (11) is not attached to at least one sidewall.

7. The enclosure according to claim 1, in which the balls are lubricated.

8. The enclosure according to claim 7, in which the sealing membrane includes an elastomer.

9. The enclosure according to claim 8, in which the sealing membrane includes at least one material for bonding the perforation-resistant reinforcement to the elastic material.

10. The enclosure according to claim 9, in which the elastic material (14) covers at least one of the faces of the perforation-resistant reinforcement (15).

11. The enclosure according to claim 10, in which the enclosure forms a pneumatic enclosure.

12. The enclosure according to claim 10, in which the enclosure forms a tank.

13. The enclosure according to claim 10, in which the enclosure forms part of a pneumatic boat.

14. The enclosure according to claim 8, in which the elastomer is halobutyl.

15. The enclosure according to claim 10, in which the pneumatic enclosure forms a vehicle tire.

16. The enclosure according to claim 7, in which the sealing membrane includes a polyurethane material.

17. The enclosure according to claim 1, in which the sealing membrane is freely movable both laterally and vertically with regard to the working strip.

18. The enclosure according to claim 17, in which the sealing membrane is capable of movement along an inside of the flexible enclosure thereby taking on, at least partially, any shape of a foreign body having perforated the envelope thus diminishing risk of complete perforation of the flexible enclosure.

19. The enclosure according to claim 1, in which a meridian length of the sealing membrane is greater than that of an inside of the flexible enclosure.

20. A flexible enclosure comprising:
a working strip (2) and sidewalls (3), the working strip and the sidewalls defining an envelope;
a sealing membrane (11) which lines at least part of the envelope, the sealing membrane (11) including an elastic material (14) and a perforation-resistant reinforcement (15), and the sealing membrane being movable relative to the working strip and being attached at opposite edges remote from the working strip; and
one or more successive sealing membranes additional to the sealing membrane, each of them lining, at least partially, an inside of the previous sealing membrane, each including an elastic material and a perforation-resistant reinforcement and being freely movable, at least partially, relative to the previous sealing membrane and each of them having a developed length of its meridian progressively greater than that of the previous sealing membrane and being attached to opposite ends of the working strip.

21. The enclosure according to claim 20, in which at least one successive sealing membrane includes a plurality of balls.

22. The enclosure according to claim 21, in which the plurality of balls includes a lubricant there between to facilitate their mutual movement under force of a pressure.

23. The enclosure according to claim 20, in which each successive sealing membrane includes a lubricant there between to facilitate movement under force of a pressure.

24. The enclosure according to claim 1, in which the sealing membrane is sufficiently flexible so as to easily take a shape of any object perforating the working strip.

25. The enclosure according to claim 1, in which the perforation-resistant reinforcement is fabricated from a textile having a high puncture-resistance.

26. The enclosure according to claim 25, in which the textile is woven.

27. The enclosure according to claim 25, in which the textile is non-woven.

28. A flexible enclosure comprising:
a working strip (2) and sidewalls (3), the working strip and the sidewalls defining an envelope; and
a sealing membrane (11) which lines at least part of the envelope, the sealing membrane (11) including an elastic material (14) and a perforation-resistant reinforcement (15), the sealing membrane being movable relative to the working strip and being attached at opposite edges remote from the working strip, and the sealing membrane being lubricated relative to the working strip by way of a bed of lubricated micro balls thereby enabling lateral and vertical movement of the sealing membrane.

* * * * *